United States Patent
Wang

(10) Patent No.: US 10,341,835 B2
(45) Date of Patent: Jul. 2, 2019

(54) BLUETOOTH MICROPHONE

(71) Applicant: D & L High-Tech Company Limited, Dublin (IE)

(72) Inventor: Qun Wang, Dublin (IE)

(73) Assignee: D & L High-Tech Company Limited, Dublin (IE)

(*) Notice: Subject to any disclaimer, the term of this patent is extended or adjusted under 35 U.S.C. 154(b) by 0 days.

(21) Appl. No.: 16/091,414

(22) PCT Filed: Nov. 10, 2016

(86) PCT No.: PCT/EP2016/077208
§ 371 (c)(1),
(2) Date: Oct. 4, 2018

(87) PCT Pub. No.: WO2017/190814
PCT Pub. Date: Nov. 9, 2017

(65) Prior Publication Data
US 2019/0159001 A1      May 23, 2019

(30) Foreign Application Priority Data

May 4, 2016   (EP) .................................... 16168258

(51) Int. Cl.
*H04B 7/00*      (2006.01)
*H04W 4/80*      (2018.01)
(Continued)

(52) U.S. Cl.
CPC .............. *H04W 4/80* (2018.02); *H04L 5/14* (2013.01); *H04R 1/08* (2013.01); *H04W 76/14* (2018.02);
(Continued)

(58) Field of Classification Search
CPC .. H04R 1/08; H04R 2201/401; H04R 25/554; H04R 1/10; H04R 1/1066; H04R 1/24;
(Continued)

(56) References Cited

U.S. PATENT DOCUMENTS 7,343,177 B2 *   3/2008   Seshadri ................. H04M 1/05
                                                        455/563
7,865,148 B2 *   1/2011   Simmons ........... H03M 13/1102
                                                        455/410
(Continued)

FOREIGN PATENT DOCUMENTS

EP      1768365 A2      3/2007
EP      2034704 A1      3/2009

OTHER PUBLICATIONS

International Search Report and Written Opinion for International Patent Application No. PCT/EP2016/077208, dated Dec. 13, 2016, 11 pages.
(Continued)

*Primary Examiner* — Nhan T Le
(74) *Attorney, Agent, or Firm* — Withrow & Terranova, P.L.L.C.

(57) ABSTRACT

A Bluetooth microphone (10) comprises a controller (MCU) and Bluetooth transceiver (12) arranged to: establish a Bluetooth paired connection with a device; establish an Advanced Audio Distribution Profile, A2DP, connection with the paired device to receive a sequence of packets from the paired device for decoding by the microphone; and establish a Serial Port Profile, SPP, connection with the paired device for simultaneously transmitting a sequence of packets based on a microphone transducer signal to the paired device as the received sequence of packets are being decoded for transmission to a set of headphones.

15 Claims, 5 Drawing Sheets

(51) Int. Cl.
  *H04W 76/14* (2018.01)
  *H04L 5/14* (2006.01)
  *H04R 1/08* (2006.01)
(52) U.S. Cl.
  CPC .... *H04R 2201/107* (2013.01); *H04R 2420/07* (2013.01); *H04R 2430/01* (2013.01)
(58) Field of Classification Search
  CPC  H04R 1/326; H04R 2410/05; H04R 2499/11; H04R 3/005; H04W 76/20; H04W 4/80
  See application file for complete search history.

(56) References Cited

U.S. PATENT DOCUMENTS

| | | | | |
|---|---|---|---|---|
| 8,687,797 | B2 * | 4/2014 | Zeng | H04M 9/082 |
| | | | | 379/406.08 |
| 9,167,086 | B1 | 10/2015 | Gilor | |
| 10,200,803 | B1 * | 2/2019 | Tong | H04S 1/005 |
| 2010/0285750 | A1 | 11/2010 | Simonelic | |
| 2013/0196721 | A1 * | 8/2013 | Waterman | H04M 1/05 |
| | | | | 455/575.2 |

OTHER PUBLICATIONS

International Preliminary Report on Patentability for International Patent Application No. PCT/EP2016/077208, dated Nov. 15, 2018, 7 pages.
Extended European Search Report for European Patent Application No. 16168258.8, dated Aug. 19, 2016, 7 pages.

* cited by examiner

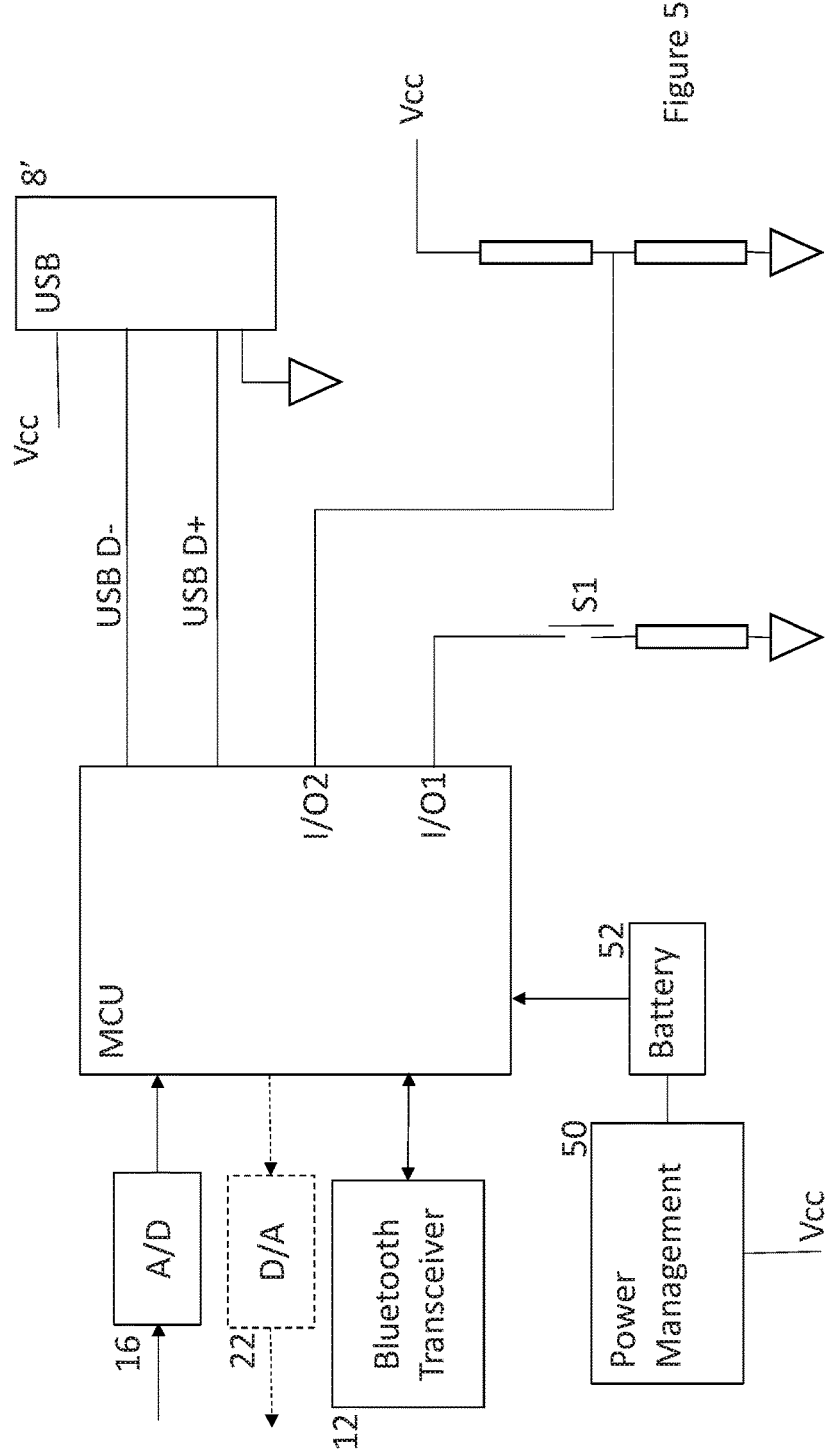

BLUETOOTH MICROPHONE

This application is a 35 USC 371 national phase filing of PCT/EP2016/077208, filed Nov. 10, 2016, which claims priority to European patent application no. 16168258.8, filed May 4, 2016, the disclosures of which are incorporated herein by reference in their entireties.

FIELD

The present invention relates to a Bluetooth microphone. In particular, the invention relates to a microphone providing full duplex communications between the microphone and a paired device.

BACKGROUND

Currently there are a large number of Bluetooth audio products in the market facilitating audio transmission between paired Bluetooth devices for example, one of a host computing device such as a general purpose computer, tablet, smartphone or smartwatch; and a microphone, headphone or headset. Almost all devices employ one of two profiles: HFP (Hands-Free Profile)/HSP (Headset Profile) for voice communication; and Advanced Audio Distribution Profile (A2DP) for playing music.

HFP describes how a host computing device, e.g. a mobile phone, can be used to place and receive calls for a hands-free device, a headset. HFP supports all the features supported by HSP. The only difference between HFP and HSP is that HFP supports additional features e.g. Call Waiting (CW). A typical configuration for HFP is an automobile using a mobile phone as a Bluetooth host. In the automobile, the vehicle audio system can be used for the phone audio and a microphone is installed in the car for sending outgoing audio. HFP can also be used for a personal computer to act as a speaker phone for a mobile phone in a home or office environment. Both HFP and HSP use Synchronous Connection Oriented (SCO) to carry a low quality mono-audio channel i.e. a mono speaker channel is transmitted to a mono audio receiver and vice versa.

When operating via A2DP, in devices which support both protocols, HFP/HSP are disconnected automatically before A2DP is enabled. Each A2DP service, of possibly many, is designed to uni-directionally transfer an audio stream in up to 2 channel stereo, either to or from the Bluetooth host.

It is desirable however to provide a Bluetooth device which provides high quality bidirectional full duplex audio with a paired device.

U.S. Pat. No. 9,167,086 discloses a wireless headset with audio recording capabilities including a microphone for receiving first audio signals generated by a user, and a BLUETOOTH module for transmitting and receiving wireless radio signals, wherein the wireless radio signals received by the BLUETOOTH module comprise second audio signals. The headset includes an audio encoder/decoder for encoding the first audio signals received by the microphone and the second audio signals received by the BLUETOOTH module to generate data, a loudspeaker, connected to the audio encoder/decoder, for playing the second audio signals to the user, a memory unit for storing the data generated by the audio encoder, and a control unit which is coupled to the audio encoder/decoder for transferring the data to the memory unit.

SUMMARY

According to a first aspect of the present invention there is provided a Bluetooth microphone according to claim 1.

The microphone enables bidirectional simultaneous transmission of audio data between the microphone and a paired device via wireless Bluetooth.

Embodiments provide audio transmission from the microphone to a paired device using the Bluetooth Serial Port Profile (SPP).

Some embodiments enable either a Bluetooth paired connection or a USB connection between a microphone and a host computing device.

BRIEF DESCRIPTION OF THE DRAWINGS

Embodiments of the invention will now be described, by way of example, with reference to the accompanying drawings, in which:

FIG. 5 is a schematic diagram of a portion of the processing components of a Bluetooth microphone according to a second embodiment of the present invention.

DETAILED DESCRIPTION

Figure 1:
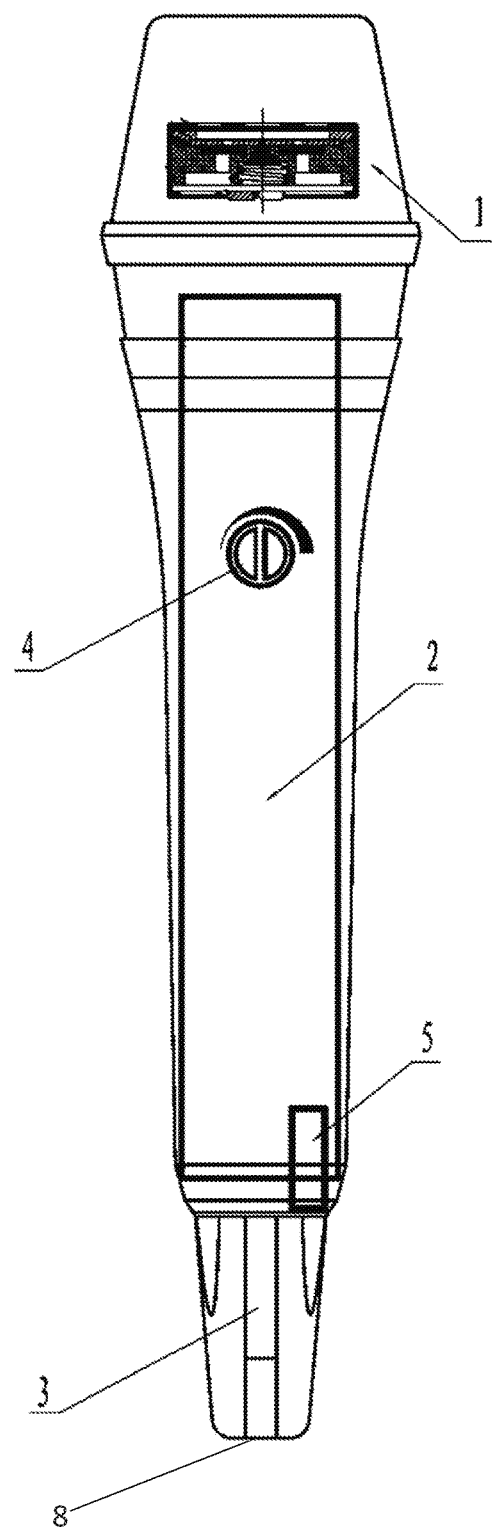
FIG. 1 is a schematic view of a Bluetooth microphone according to an embodiment of the present invention.

Referring now to FIG. 1, there is shown a Bluetooth microphone 10 according to an embodiment of the present invention. The microphone 10 has a generally conventional form factor with a generally cylindrical body 12 having a microphone transducer 1 incorporated at its top end. At the bottom of the microphone 10, there are provided 2 connectors, a first comprises a 3.5 mm stereo audio port 5 into which a jack for pair of headphones (not shown) can be plugged. (It will be appreciated nonetheless that any suitable headphone connector can be provided.) A second comprises a micro-USB port 8 into which a USB lead can be connected to provide power for the microphone electronics and/or to charge an on-board microphone battery (not shown). A volume control dial 4 is mounted to the side of the microphone body and this enables a user to control their recording volume. A Bluetooth antenna 3 is incorporated within the body of the microphone 10. Each of the integrated microphone transducer 1, Bluetooth antenna 3, 3.5 mm port 5, the USB port 8 and the volume control dial 4 are electronically connected to a PCB 2.

It will be appreciated that any number of form factors can be employed for the microphone 10 and that the microphone 10 may include any number of additional switches, such as on/off switches, a pairing button, indicators, such as battery or volume level indicators etc.

Figure 2:
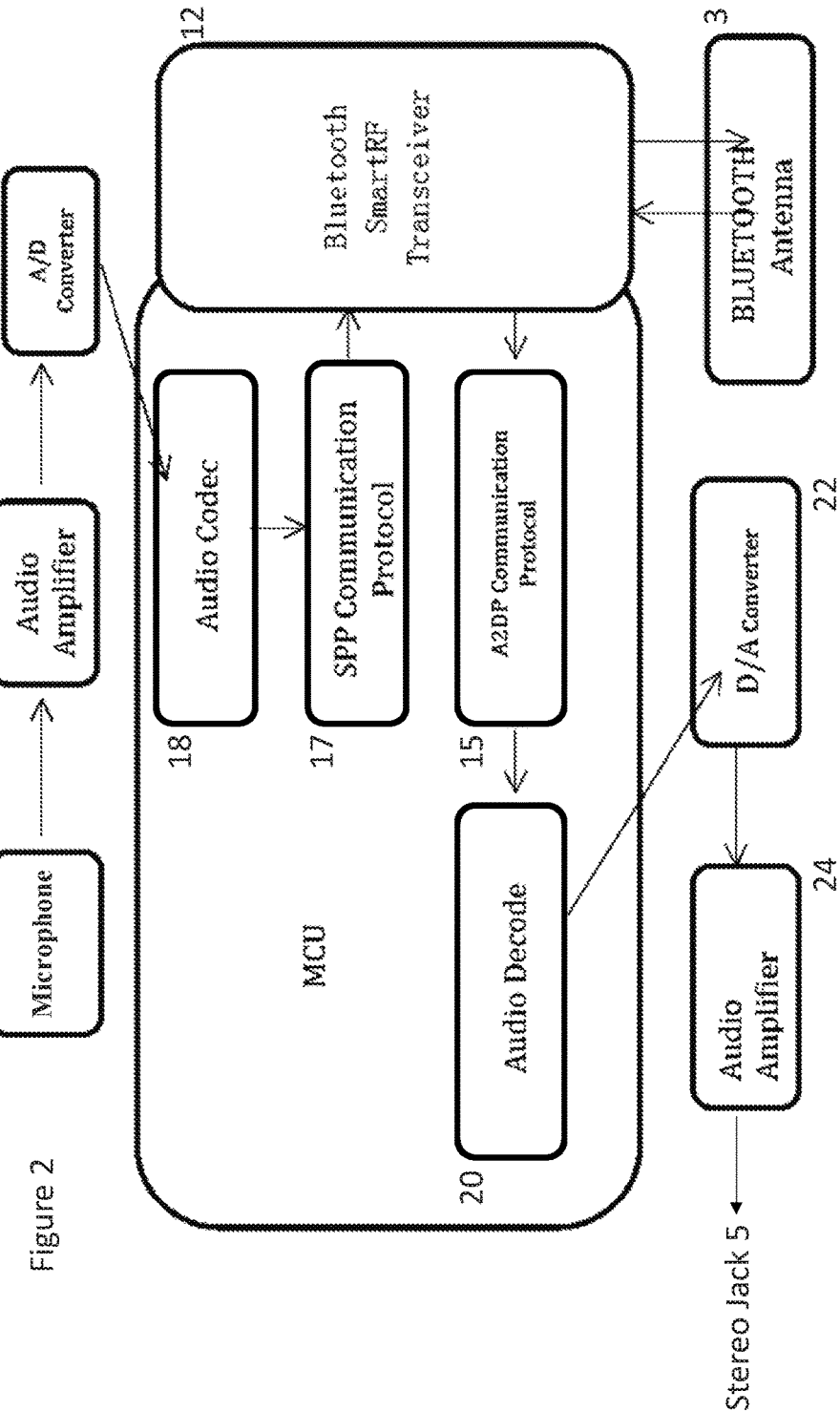
FIG. 2 is a schematic diagram of the processing components of the microphone of FIG. 1.

Referring now to FIG. 2, the PCB 2 incorporates a micro-control unit (MCU) and a Bluetooth transceiver 12. The MCU supports both an A2DP profile 15 as well as an SPP profile 17. Support for A2DP and SPP can be provided either in software or MCU firmware, but in any case the modules 15, 17 enable the MCU to communicate via the transceiver 12 with a paired device according to those profiles.

The A2DP 15 module is used to establish an A2DP connection with a dedicated control application (not shown) running on a paired device; to receive a streamed stereo signal from the paired device via the Bluetooth antenna 3 using the A2DP connection; to decode 20 the streamed stereo signal; and to drive the decoded digital data through a twin D/A converter 22 and twin amplifier 24 where the analog signal(s) are provided through the stereo jack 5 to any connected headphones in an otherwise conventional manner.

The microphone transducer 1 provides its mono signal via an audio amplifier 14 and A/D converter 16 to the MCU where the digital data is encoded into a suitable packetised format by an MCU audio codec 18. (In one embodiment, the volume control button can be directly connected to control the amplifier 14, whereas in other embodiments, it is connected to an analog port of the MCU which can then control the recording volume accordingly.) In the embodiment, the A/D converter 16 converts the amplified microphone signal into an $I^2S$ signal. ($I^2S$, also known as Inter-IC Sound, Integrated Interchip Sound, or IIS, is an electrical serial bus interface standard used for connecting digital audio devices together. It is used to communicate PCM audio data between integrated circuits in an electronic device. The $I^2S$ bus separates clock and serial data signals, resulting in a lower jitter than is typical of communications systems that recover the clock from the data stream.)

Typically, when is SPP module such as the module 17 is incorporated in a Bluetooth device, it enables the device to exchange discrete files with a paired device. File exchanges do not occur when one of the devices is streaming music to the other device, but even if this were to happen the exchange would be handled independently by separate applications on the paired devices.

On the other hand, in embodiments of the present invention, simultaneous bidirectional audio data transmission between a host computing device and the microphone 10 comprises implementing unidirectional transmission of a streamed audio signal via A2DP from the paired device to the microphone 10, as described above, while implementing reverse transmission of an audio signal via SPP from the microphone 10 to the paired device.

In more detail, the paired device typically runs a control application compatible with the microphone 10 and which is arranged to supply a high quality audio signal to the microphone 10 and at the same time to receive a recorded signal from the microphone 10. So for example, a typical control application enables a musician to record a track while listening to a backing track through headphones which are plugged into the microphone 10.

The microphone enables the musician to choose any headphones they wish whether over-the-ear headphones, ear-buds or possibly even active or passive noise cancelling headphones.

As such, the control application might provide a user interface on the paired device enabling the user to select a track to be played and to indicate that recording should begin.

(Alternatively, the microphone could also be provided with a record button which the user can press to signal to the host that recording is to begin.)

In any case, once a record request has been sent to the control application either from within the application or via the Bluetooth link, a SPP link request is sent to the microphone 10.

At the same time as initiating the SPP channel, the control application starts to transmit the background music using the A2DP channel so that the microphone 10 receives the music data from the paired device via the A2DP module 15.

Once the microphone 10 receives the request to initiate an SPP channel, an SPP channel is set up between the paired device and the microphone 10. After the SPP channel has been successfully established, the A/D converter 16 and codec 18 are activated.

The A/D converter 16 can operate within a range of sampling frequencies, for example, from 8 kHz-192 kHz and especially at standard frequencies such as 12 kHz, 16 kHz 32 kHz, 44.1 kHz, 48 kHz and 96 kHz and bit precisions of, for example, 8, 12, 16, 24 or 32 bits. Normally, the codec 18 encodes a fixed number of acquisition points, in a standard encoding format such as AAC, MP3, WMA, aptX etc. For example, for an acquisition rate of 44.1 kHz and 16 bit precision, 1152 acquisition points are typically encoded as a group. Using the MP3 format, these acquisition points will become one frame of encoded data.

Figure 3:
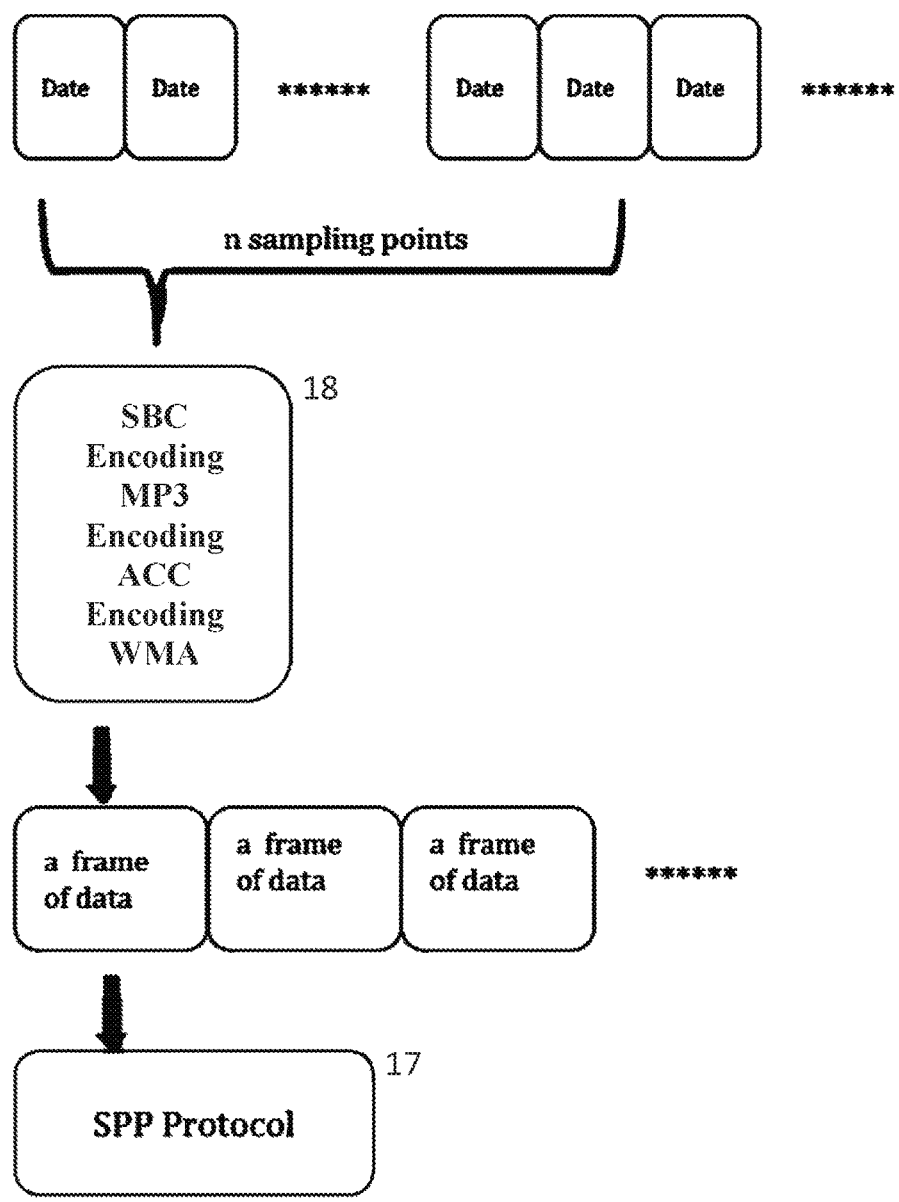
FIG. 3 shows the encoding of a recorded audio signal by the microphone of FIG. 1 using the SPP protocol.

FIG. 3 shows sets of m-bit data where for example, m=8 or 16, being provided by the A/D converter 16 to the codec 18. The A/D convert acquires n sampling points of data at the required sampling frequency and bit rate and these form a group of data which is encoded by the codec 18 in a format such as AAC, MP3, WMA, aptX or any other encoding format to generate a frame of data. Each frame of data is then transmitted via the SPP module 17. This process is performed continuously until recording ceases so that continuous immediate data transmission can be provided by the microphone 10 to the paired device.

After the encoding process for a frame has been completed within the microphone 10, the microphone 10 transmits this frame of data to the control application via the SPP channel provided by the module 17. The control application will thus receive data frames which can be stored in chronological order as an audio file.

In order to ensure the continuity and accuracy of recorded data, encoded frames of audio data can be transmitted through a transmit buffer (not shown) within the MCU. Thus, a certain amount of recorded audio data can be cached within the MCU so that it can be possible to recover from any momentary loss of communication between the microphone 10 and the paired device hosting the control application.

Once the SPP communication recovers, the microphone 10 can re-start transmitting data from the buffer until the cache is again empty.

Similarly, the MCU can include a receive buffer (not shown) for packets received from the paired device so that packets can be received faster than they are played. This enables the microphone 10 to smoothly relay received audio to the headphones even in the presence of a communications blockage.

Typically, the control application receiving encoded audio packets from the microphone 10 via the SPP channel can simply store the audio data. The stored microphone audio data can then be replayed either by the control application or any other application on any other device, as required, synchronized with the audio data originally provided by the control application to provide an overlay track for the original audio data.

Alternatively, a control application could actually play the microphone audio data as it is received either on the paired device's own speakers or via speakers connected to the paired device (possibly even wireless speakers).

Figure 4:
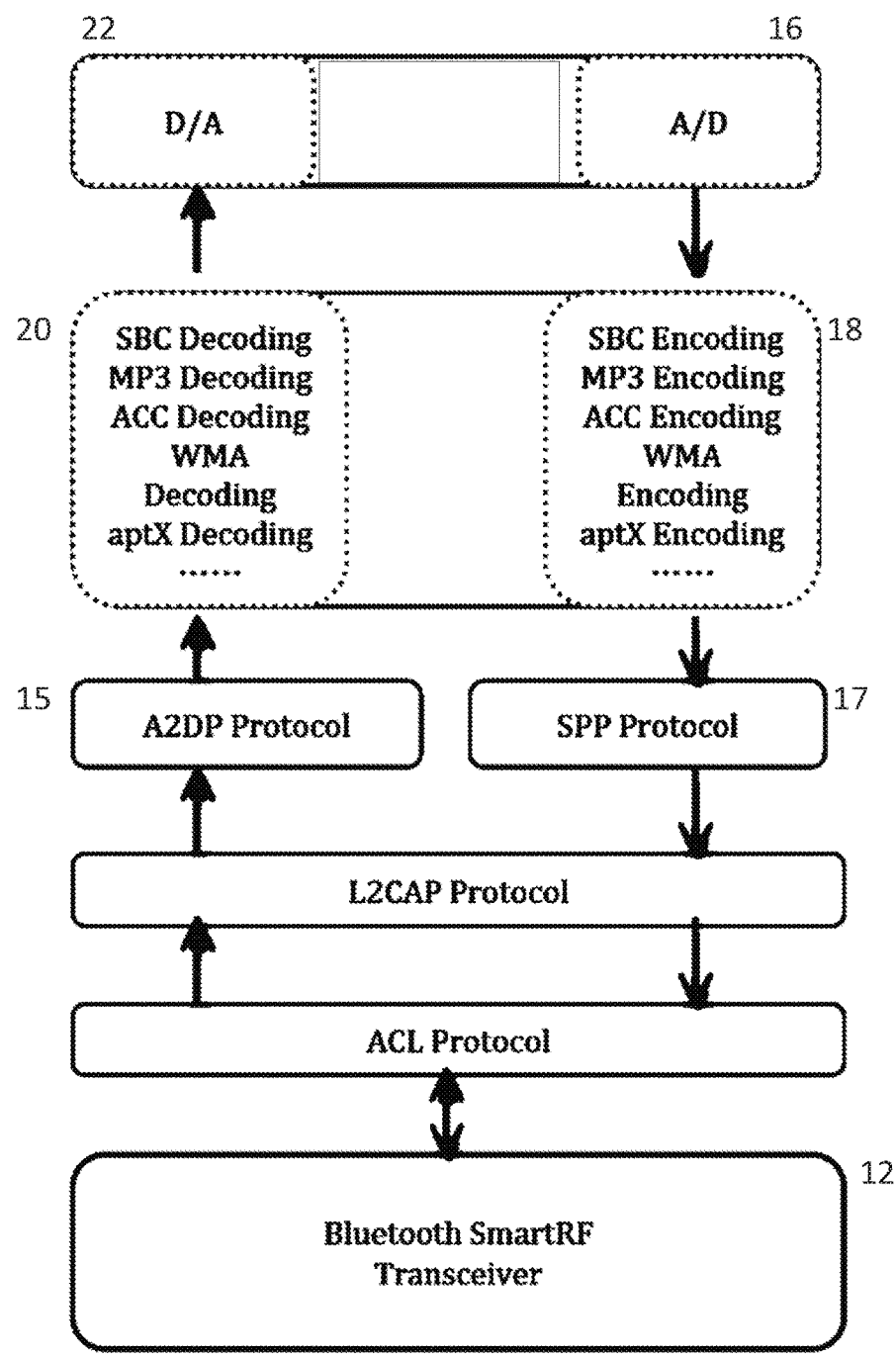
FIG. 4 illustrates a protocol stack maintained by the microphone of FIG. 1.

For completeness, FIG. 4 shows a complete protocol stack operating during a session when the microphone 10 is both streaming audio to the paired device and receiving streamed audio from the paired device. As will be seen, each of the A2DP and SPP session data can be passed using the L2CAP protocol to or from an ACL link manager. In alternative embodiments, packets can be passed via a Host Controller Interface (HCI).

Referring now to FIG. 5, in a second embodiment of the present invention, the Bluetooth microphone is arranged to selectively connect to a host device not alone with a Bluetooth paired connection, but alternatively via an adapted USB connector 8'.

Typically, for Bluetooth microphones which provide wired or wireless connection to a host device, the wired connection is provided via a removable analog audio cable connecting a 3.5 mm port on the microphone to a 3.5 mm port on the host device.

In the embodiment of FIG. 5, not only is the Vcc pin of the USB connector 8' connected via power management circuitry 50 to trickle charge the on-board microphone battery 52, but the USB microphone pins D− and D+ are connected to corresponding ports on the MCU. (One of the microphone lines D−, D+ may correspond with ground rather than being a differential signal as shown.)

In this embodiment, all of the processing blocks can also be included in the microphone as described in FIG. 2 and where not relevant they are not described further in relation to FIG. 5.

In FIG. 5, the microphone includes an ON/OFF button S1. The MCU begins in standby mode and in response to sensing the ON/OFF button S1 being pressed through port I/O1, it enters into Bluetooth pairing mode and establishes a Bluetooth paired connection with a host computing device in a conventional manner. The microphone can then operate in the same manner as the microphone 10 of FIG. 2, providing simultaneous microphone recording and streaming to headphones, or the microphone can act as a dedicated Bluetooth microphone.

It will be appreciated that where the microphone of FIG. 5 is to act as a dedicated microphone, it need not use the special SPP profile of the microphone 10 of FIG. 2 and instead can use any conventional profile for streaming the microphone signal to the host device—as such in this mode, the microphone can be compatible with any application running on the host device.

On the other hand, if the microphone connects to a host computing device through a USB cable, the MCU senses the connection through port I/O2. In this case, the microphone switches over to act as a USB microphone being powered through the power management circuitry 50 and providing the microphone signal from the A/D converter 16 to USB microphone lines D− and D+. (In FIG. 5, this connection is shown as being provided via the A/D converter 16 and MCU, but the connection to the USB socket 8' could also be implemented with discrete circuitry from the amplifier 14 in conjunction with the MCU.) In any case, it will be appreciated that the codec 18 (and possibly the A/D converter 16) employed for Bluetooth communications need not be used and an unencoded analog signal can be provided directly to the host computing device.

When in this mode and the USB cable is unplugged, the microphone switches back into standby mode automatically.

If a user connects the microphone of FIG. 5 to a power adapter through a USB cable, the microphone battery 52 can simply charge in the conventional manner via the power management circuitry 50. Using the circuitry of FIG. 5, the MCU may not sense the difference between being connected to a power adaptor or host computing device, however, it will be seen that it is not a drawback in this case for the MCU to provide microphone signals to USB microphone lines D− and D+, as the microphone is being powered through the USB cable and so the battery 52 is not being drained. Nonetheless, if the MCU can sense the difference between Vcc provided by a host computing device and a power adaptor and senses the latter, the microphone MCU can remain in standby mode while the battery is charging.

It will be appreciated that the functionality of the microphone of FIG. 5 could be extended further by connecting the USB left and right audio signal pins (not indicated) to respective ports (not shown) of the MCU—a common line would be shared with the microphone. In this case, once the MCU switches into USB microphone mode as described above, the left and right audio signals could be provided by the MCU directly or via discrete circuitry to the twin amplifier 24, bypassing the decoder 20 and D/A converter 22 used for Bluetooth communications.

In either case, USB microphone mode takes precedence over Bluetooth operation so that if Vcc is sensed by the MCU, any Bluetooth paired connection will be disconnected.

The invention claimed is:

1. A Bluetooth microphone comprising:
    a transducer arranged to provide an electronic representation of an acoustic signal;
    an analog-to-digital converter for converting said electronic representation into a digital signal;
    a codec for producing a sequence of packets based on said digital signal;
    a decoder for converting a received sequence of packets into a digital stereo signal;
    a digital-to-analog converter for converting said digital stereo signal into a stereo analog signal suitable for transmission to a set of headphones; and
    a controller and Bluetooth transceiver arranged to:
        establish a Bluetooth paired connection with a device;
        establish an Advanced Audio Distribution Profile, A2DP, connection with the paired device to receive said sequence of packets for said decoder from said device; and
        establish a Serial Port Profile, SPP, connection with the paired device for simultaneously transmitting said produced sequence of packets based on said digital signal to said paired device as said received sequence of packets are being decoded for transmission to said set of headphones.

2. The Bluetooth microphone according to claim 1 further comprising an actuator for signaling to said paired device that said microphone is ready to establish each of said A2DP and said SPP connections.

3. The Bluetooth microphone according to claim 1 further comprising a volume controller for indicating a desired volume for recording said acoustic signal.

4. The Bluetooth microphone according to claim 1 further comprising a headphone socket for receiving and headphone jack and for transmitting said stereo analog signal to said headphones.

5. The Bluetooth microphone according to claim 1 further comprising a USB socket for receiving a USB lead, said socket between operably connected to a re-chargeable battery for charging said Bluetooth microphone.

6. The Bluetooth microphone according to claim 1 wherein said A/D converter is arranged to sample said acoustics signal at between 8 kHz-192 kHz.

7. The Bluetooth microphone according to claim 1 wherein said analog-to-digital converter is arranged to provide a digital representation of between 8 bits to 32 bits resolution of said acoustic signal.

8. The Bluetooth microphone according to claim 1 wherein said codec is arranged to encode said digital signal in one of: AAC, MP3, WMA or aptX formats.

9. The Bluetooth microphone according to claim 1 wherein said controller includes a buffer and wherein said sequence of packets based on said digital signal are transmitted to said paired device through said buffer when communications are available with said paired device.

10. The Bluetooth microphone according to claim 1 that is part of a system including computer executable code which when executed upon a Bluetooth device is arranged to:
   establish a paired connection with said Bluetooth microphone;
   establish an Advanced Audio Distribution Profile (A2DP) connection with the Bluetooth microphone to transmit said sequence of packets for said decoder to said Bluetooth microphone; and
   establish a Serial Port Profile (SPP) connection with the Bluetooth microphone for simultaneously receiving said sequence of packets from said Bluetooth microphone as said sequence of packets are being transmitted to said Bluetooth microphone.

11. The Bluetooth microphone according to claim 10 wherein said computer program code is arranged to provide a user interface enabling a user to select an audio file to be streamed to said Bluetooth microphone through said A2DP connection.

12. The system Bluetooth microphone according to claim 11 wherein said computer program code is arranged to provide a user interface enabling a user to initiate each of said A2DP and SPP connections, to begin streaming said selected an audio file and to begin receiving said sequence of packets from said Bluetooth microphone.

13. The Bluetooth microphone according to claim 11 wherein said computer program code is arranged to store said received sequence of packets as an audio file.

14. The Bluetooth microphone according to claim 5 in which said USB socket microphone pins are connected to said controller and wherein said controller is responsive to sensing power being provided to said microphone through said USB socket, for providing an electronic representation of said acoustic signal to said USB socket microphone pins.

15. A Bluetooth microphone comprising:
   a transducer arranged to provide an electronic representation of a mono acoustic signal;
   an analog-to-digital converter for converting said electronic representation into a digital signal;
   a codec for producing a sequence of packets based on said digital signal;
   a decoder for converting a received sequence of packets into a digital stereo signal;
   a digital-to-analog converter for converting said digital stereo signal into a stereo analog signal suitable for transmission to a set of headphones; and
   a controller and Bluetooth transceiver arranged to:
      establish a Bluetooth paired connection with a device;
      establish a connection with the paired device to receive, from said device, said
      sequence of packets encoding said digital stereo signal for said decoder; and establish a connection with the paired device for simultaneously transmitting said produced sequence of packets based on said digital signal to said paired device as said received sequence of packets are being decoded for transmission to said set of headphones.

* * * * *